Jan. 6, 1942.                R. M. PFALZGRAFF                 2,269,229
                      INSULATION OF ELECTRICAL APPARATUS
                             Filed Dec. 10, 1937
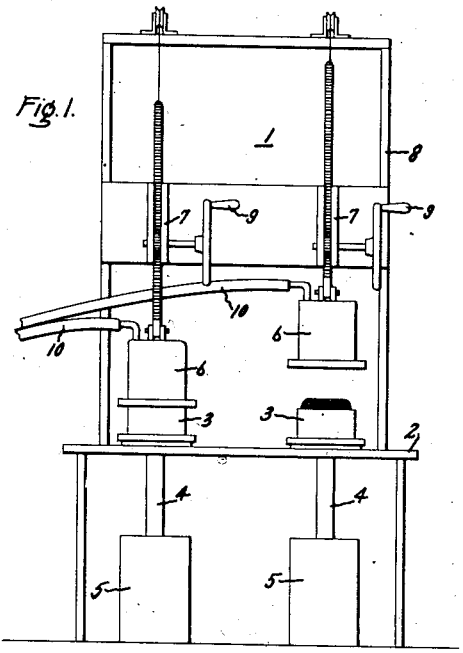
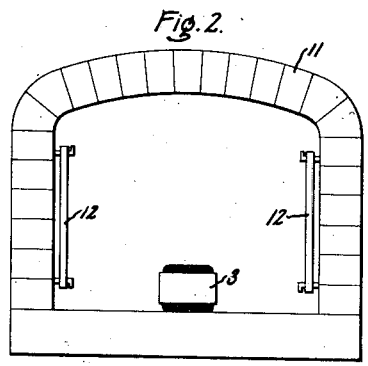
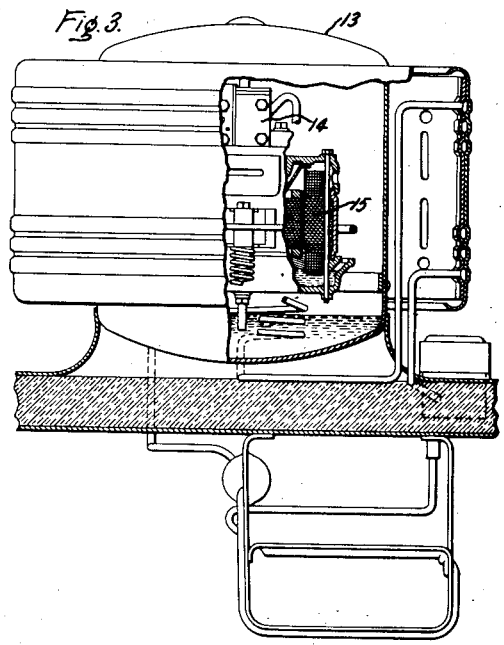
Inventor:
Ross M. Pfalzgraff,
by Harry E. Dunham
His Attorney.

Patented Jan. 6, 1942

2,269,229

UNITED STATES PATENT OFFICE 2,269,229

INSULATION OF ELECTRICAL APPARATUS

Ross M. Pfalzgraff, Nahant, Mass., assignor to General Electric Company, a corporation of New York Application December 10, 1937, Serial No. 179,172

5 Claims. (Cl. 62—115)

The present invention relates to the insulation of electrical apparatus. More specifically, the invention is directed to the insulation of electrical apparatus wherein the insulation is constantly subject to attack by oils, for example, lubricating oils, and gases, such as refrigerants, coming in contact therewith.

The insulation of motors used, for instance, in refrigerating systems of the sealed type wherein both the oil, used for lubricating the compressor parts, and the refrigerating gas come in contact with the insulation of the stator windings, has presented the serious problem of protecting the insulation from attack. Ordinarily the windings of the stator are insulated with fibrous material such as, cotton, which is impregnated and coated with a varnish. The varnish is usually sufficient to protect the cotton insulation from attack by the oils but such varnishes have been found to be attacked by refrigerants, particularly refrigerants of the chlorinated type such as difluordichlormethane, $CF_2CL_2$. The result of such attack is to contaminate the lubricating oils, causing sludging which results in turn in the clogging of valves, rendering the apparatus inoperable.

In accordance with the present invention it has been found possible to effectively insulate electrical units, such as for example, the windings of motor stators so as to render the insulation oil-resistant and resistant to attack by chlorinated refrigerants, particularly, difluordichlormethane.

In the accompanying drawing forming part of this application,

Figure 1 is a diagrammatic view in elevation of apparatus used in treating the insulation of electrical units in accordance with my invention;

Figure 2 is a diagrammatic view in elevation of heat-treating means for the impregnated electrical units; and Figure 3 is a view partly in elevation and partly in section showing a refrigerating unit in which the treated electrical units may be employed.

In carrying my invention into practice I have found that it is necessary to use a particular compound in the form of a viscous solution or cement between certain critical limits of concentration in order to effectively impregnate the electrical units, e. g. the stator windings, and render them resistant to attack by the refrigerant.

The particular compositions which I employ are, generally speaking, plastic polymers of chloroprene. The term "chloroprene" as used herein designates the chemical compound chloro-2-butadiene-1,3. The latter may be prepared, for instance, from monovinyl acetylene and hydrochloric acid. Upon subjection to ultraviolet light, plastic polymers of chloroprene are produced. Such polymers may be obtained on the market under the name of "Neoprene."

In order effectively to utilize the plastic polymers of chloroprene as insulation for electrical units, such as stator windings, it has been found necessary to compound them with certain ingredients in a specific manner and to carry out the impregnation and coating process in a definite way using a particular proportion of solids in the impregnating compound.

In order to illustrate the invention there is given below the following detailed procedure of preparation of the compound and impregnation of the windings of a stator unit which is part of a motor operating in an atmosphere of difluordichlormethane:

Ingredients

| | Parts by weight |
|---|---|
| Polastic polymers of chloroprene | 100 |
| Light calcined magnesia | 10 |
| Zinc oxide | 5 |
| Wood rosin | 2 |

Method of compounding

The plastic polymers of chloroprene are warmed on heated mixing rolls, the magnesia is first added, then the wood rosin and finally zinc oxide is added. The compound is worked on the rolls until a fine sheet is obtained. This operation should be carried out quickly and scorching of the compound avoided.

The thin sheet is cut into small pieces placed in a cement churn where it is agitated with xylol as a solvent. The concentration of solids employed is 25 to 30% by weight. It is very important to obtain the correct concentration of solids or else the cement will not be satisfactory as an impregnating medium for the insulation windings. A 25 to 30% concentration of solids has been found to be the correct concentration to employ in order to obtain an extremely viscous compound which can be utilized to penetrate the interstices of the winding properly to impregnate it and to bond effectively adjacent turns. A higher solids concentration is ineffective as an impregnant and bonding agent as the compound is too viscous and cannot be forced into the winding; on the other hand, when the solids content of the cement is materially below 25% the compound merely goes into the winding and comes out again when the stator is removed from the impregnating apparatus.

Method of impregnation

In order to utilize effectively the very viscous cement a special procedure must be followed in the impregnation process, utilizing the apparatus shown in Fig. 1 of the drawing.

This apparatus indicated generally at 1 comprises a platform 2 on which is mounted a holder 3 for the stator being impregnated. Connected to the holder 3 by means of pipe 4 is a receptacle 5 which contains the impregnating compound. Above the holder is a cover member 6 connected by a rack and pinion mechanism 7 mounted on frame-work 8 which mechanism is operable by means of a hand wheel 9 to raise or lower the cover member 6. Leading from the cover member is a connection 10 to vacuum and air pressure apparatus (not shown). The cover member is lowered over the stator as shown in the left-hand side of Fig. 1 and vacuum applied.

The wound stator in which the conductors have been insulated with a fibrous material, such as cotton, is thus placed under vacuum to withdraw all of the air in the windings. The compound as prepared, is then drawn from receptacle 5 by vacuum into the windings and the cement allowed to penetrate entirely therein. This operation will take about 10 to 15 minutes under full vacuum (29") depending on the size of the stator. The vacuum is broken and the stator allowed to soak in the cement at room pressure about 10 to 35 minutes depending on the size of the stator.

The cover member 6 then is raised as shown in the right-hand side of Fig. 1 and the impregnated stator is allowed to drain by gravity in place for a short period, say 5 minutes. The stator then is removed and allowed to drain for a period of about 15 hours, after which the impregnated stator is placed in an oven 11 preferably electrically heated as by means of electrical units 12 for about 3½ hours at about 140° C., the time and temperature of baking varying with the size of the stator.

In Fig. 3 there is shown a refrigerating unit of the sealed type in which motors having the treated stators are adapted to operate. This unit briefly comprises a casing 13 containing a gaseous refrigerant which is compressed by a compressor 14 driven by motor 15 the stator of which is in contact with both the gaseous refrigerant and the lubricating oil used to lubricate the compressor and other parts of the unit.

Electrical units in which the windings have been impregnated as outlined above are completely resistant to attack by chlorinated refrigerants, such as, difluordichlormethane. The windings of stators of motors so treated are completely impregnated and solidly cemented between the individual turns.

What I claim as new and desire to secure by Letters Patent of the United States is:

1. An electrical unit comprising a fibrous covered winding impregnated and cemented between individual turns with a cement comprising a solvent and plastic polymers of chloroprene, said cement having an initial concentration of 25 to 30% by weight of solids therein.

2. In an electrical motor adapted to operate in an atmosphere of difluordichlormethane, a stator consisting of fibrous covered windings, said windings being cemented between turns and completely impregnated with a cement comprising 25 to 30% by weight of plastic polymers of chloroprene.

3. In combination, a refrigerating unit of the sealed type having a motor, a gaseous refrigerant of the chlorinated type and lubricating oil, said refrigerant and lubricating oil coming in contact with the stator of said motor, said stator having fibrous covered windings impregnated with a cement comprising 25 to 30% by weight of plastic polymers of chloroprene.

4. The method of protecting an electrical winding against attack by gaseous chlorinated refrigerants which comprises impregnating said winding with a viscous cement containing 25 to 30% by weight of plastic polymers of chloroprene.

5. The method of sealing and insulating a fibrous covered stator winding against attack by dichlordifluormethane which comprises impregnating the winding under vacuum with a viscous cement containing 25 to 30% by weight of plastic polymers of chloroprene, removing the excess cement from the winding and baking the impregnated stator at an elevated temperature for a time sufficient to effectively seal the winding between individual turns.

ROSS M. PFALZGRAFF.